US007765569B2

(12) United States Patent
MacBeth et al.

(10) Patent No.: US 7,765,569 B2
(45) Date of Patent: Jul. 27, 2010

(54) NAVIGATION AIDS FOR TELEVISION USER INTERFACE

(75) Inventors: Scott Allan MacBeth, San Diego, CA (US); Ashish Garg, San Diego, CA (US); William Arthur Schupp, San Diego, CA (US); Robert G. Hansen, Poway, CA (US); Michael Donald McDermott, Chula Vista, CA (US); Philip McKay, San Francisco, CA (US); Hong Nguyen, San Diego, CA (US); Norifumi Takaya, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1299 days.

(21) Appl. No.: 11/009,215

(22) Filed: Dec. 9, 2004

(65) Prior Publication Data

US 2006/0015903 A1 Jan. 19, 2006

Related U.S. Application Data

(60) Provisional application No. 60/585,316, filed on Jul. 2, 2004.

(51) Int. Cl.
*G06F 3/00* (2006.01)
(52) U.S. Cl. ...................................................... 725/39
(58) Field of Classification Search ............. 725/1–153; 348/569, 570, 731, 732
See application file for complete search history.

(56) References Cited

U.S. PATENT DOCUMENTS

| 5,621,456 A | * | 4/1997 | Florin et al. | 725/43 |
| 5,850,218 A | * | 12/1998 | LaJoie et al. | 725/45 |
| 6,154,203 A | * | 11/2000 | Yuen et al. | 725/52 |
| 6,493,038 B1 | * | 12/2002 | Singh et al. | 348/565 |
| 6,583,825 B1 | * | 6/2003 | Yeun et al. | 348/731 |
| 6,700,624 B2 | * | 3/2004 | Yun | 348/555 |
| 6,704,028 B2 | * | 3/2004 | Wugofski | 715/719 |
| 6,766,526 B1 | * | 7/2004 | Ellis | 725/57 |
| 6,817,027 B1 | * | 11/2004 | Curreri | 725/28 |
| 6,839,903 B1 | * | 1/2005 | Shintani et al. | 725/39 |
| 6,853,308 B1 | * | 2/2005 | Dustin | 340/825.69 |
| 6,985,190 B1 | * | 1/2006 | Klopfenstein et al. | 348/569 |
| 7,107,532 B1 | * | 9/2006 | Billmaier et al. | 715/720 |
| 2002/0073425 A1 | * | 6/2002 | Arai et al. | 725/44 |
| 2002/0101541 A1 | * | 8/2002 | Takagi et al. | 348/569 |
| 2005/0235321 A1 | * | 10/2005 | Ahmad-Taylor | 725/56 |
| 2005/0251827 A1 | * | 11/2005 | Ellis et al. | 725/47 |

FOREIGN PATENT DOCUMENTS

WO          WO 0174065         *   1/2001

OTHER PUBLICATIONS

Advanced Television Systems Committee, ATSC Standard: Program and System Information Protocol for Terrestrial Broadcast and Cable (Revision B), Document A/65B, Mar. 18, 2003,ATSC, pp. 9-10.*
Advanced Television Systems Committee, ATSC Standard: Program and System Information Protocol for Terrestrial Broadcast and Cable, Document A/65B, Mar. 18, 2003, Revision B, 9-10.*

* cited by examiner

*Primary Examiner*—Brian T Pendeleton
*Assistant Examiner*—Cai Chen
(74) *Attorney, Agent, or Firm*—John L. Rogitz

(57) ABSTRACT

Various menu and cursor arrow navigation aids are disclosed for television systems.

10 Claims, 3 Drawing Sheets

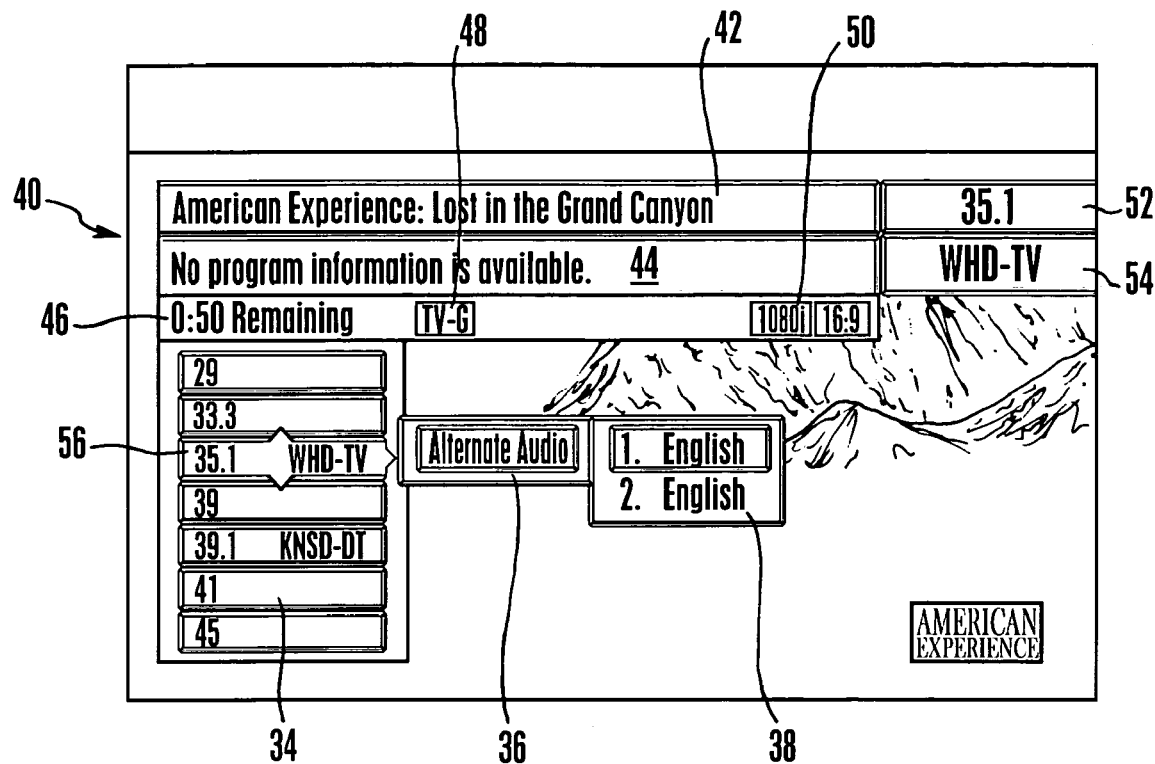
Figure 3
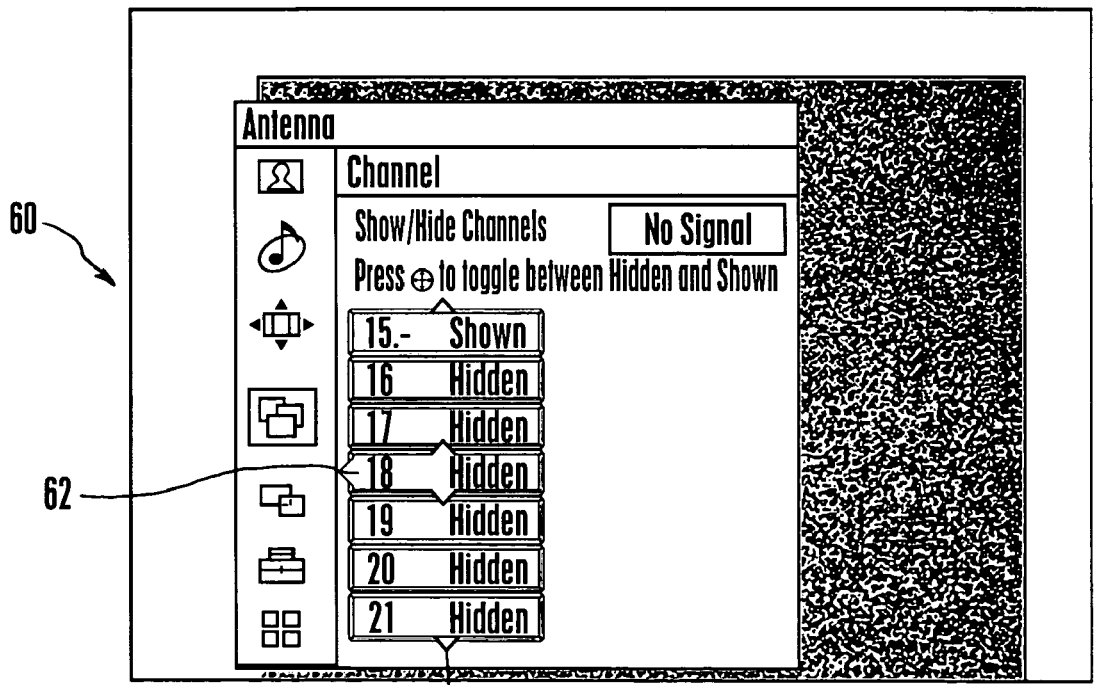
Figure 4  Show-hide analog channel

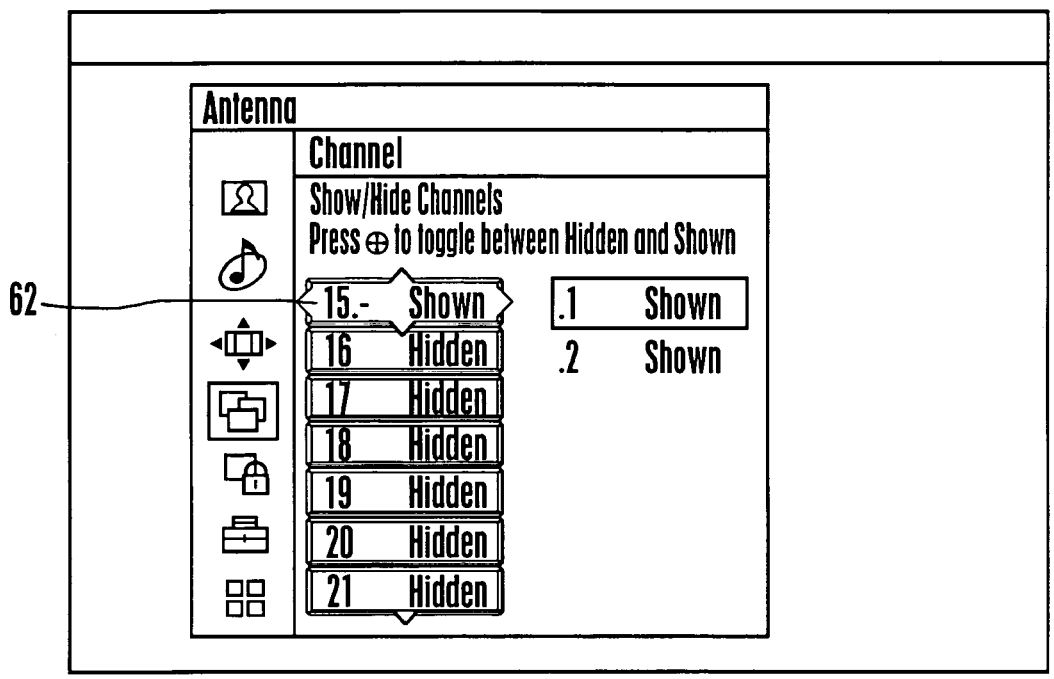
Figure 5  Show-hide major channel
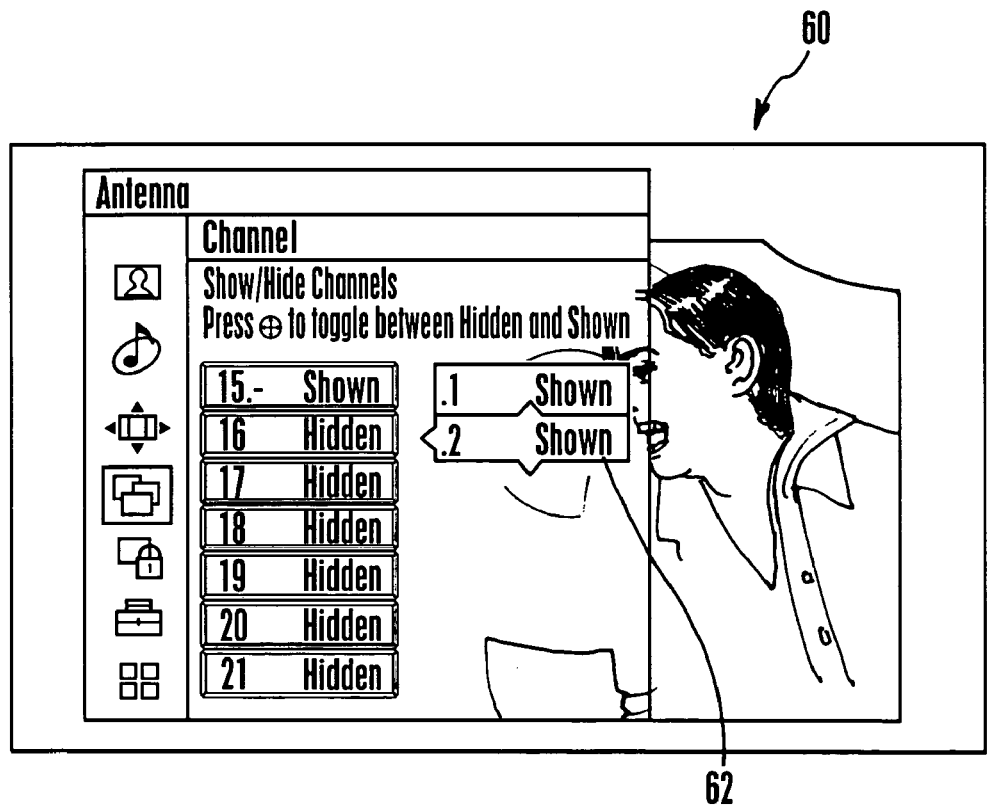
Figure 6  Show-hide minor channel

NAVIGATION AIDS FOR TELEVISION USER INTERFACE

RELATED APPLICATIONS

This application claims priority from U.S. provisional application Ser. No. 60/585,316, filed Jul. 2, 2004.

BACKGROUND OF THE INVENTION

I. Field of the Invention

The present invention relates generally to television systems.

II. Description of the Related Art

Advanced televisions typically have graphical user interfaces ("GUI") that are presented on the TV screen and that can be navigated through using a television remote control device for various purposes, including establishing TV settings. As recognized herein, many existing TV GUI are modelled after computer GUI, but as further recognized herein many TV viewers might be less steeped in computer operation than the average computer user and, hence, might require simpler, more obvious GUI. With this in mind, various features disclosed below have been provided.

SUMMARY OF THE INVENTION

A TV system includes a TV tuner receiving TV content and a TV monitor for displaying the TV content. A processor communicates with the tuner and monitor and can cause a graphical user interface (GUI) to be displayed on the monitor.

In one aspect, the GUI can include a favorite channels menu that is a main menu and that includes an add to favorites button which, when selected by a user, adds a selected channel to a favorite TV channels list. In some implementations, if a channel not on the list is tuned to when the favorite channels menu is invoked, the button is highlighted. On the other hand, if a channel on the list is tuned to when the favorite channels menu is invoked, an indication of the channel on the list is highlighted.

In another aspect, the processor automatically causes an indication to appear of alternate audio and/or video next to a channel on the channel list when a screen cursor is on the channel and alternate audio and/or video is available. If desired, the processor can establish a default audio stream and default video stream for a channel, and if a user selects an alternate stream other than a default stream and the alternate stream becomes unavailable, the processor can automatically switch back to the default stream. If a stream other than the default stream is selected, content from the selected stream can be displayed until a next tuning or input change, at which time the processor may automatically return to display content from the default stream.

In another aspect, the channel list merges analog channel information with digital channel information to render a list of analog and digital channels. The analog information can be extended data services (XDS) information provided by broadcasters and the digital information can be digital program and system information protocol (PSIP) data from broadcasters.

If desired, the channel list may be displayed along with a program banner to establish a program guide, or the program banner may be presented without showing the channel list. The program banner may include a program title area, a program information area, a time remaining area, a program rating information area, a stream information area, a channel number display area, and a channel call sign display area. Instead of showing channel number and label, the banner can show video input number and label when, e.g., a DVD is being shown.

In another aspect, the GUI includes a show/hide channel menu listing both analog and digital channels and usable to establish which channels will be listed on the channel list.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a screen shot of a display presented on the monitor, showing an integrated program guide and banner and showing that alternate audio/video channels are listed on the channel list;

FIG. 4 is a screen shot of a display presented on the monitor, showing the show-hide menu when the cursor is on an analog channel;

FIG. 5 is a screen shot of a display presented on the monitor, showing the show-hide menu when the cursor is on a major digital channel; and FIG. 6 is a screen shot of a display presented on the monitor, showing the show-hide menu when the cursor is on a minor digital channel.

DETAILED DESCRIPTION OF THE PREFERRED EMBODIMENTS

Figure 1:
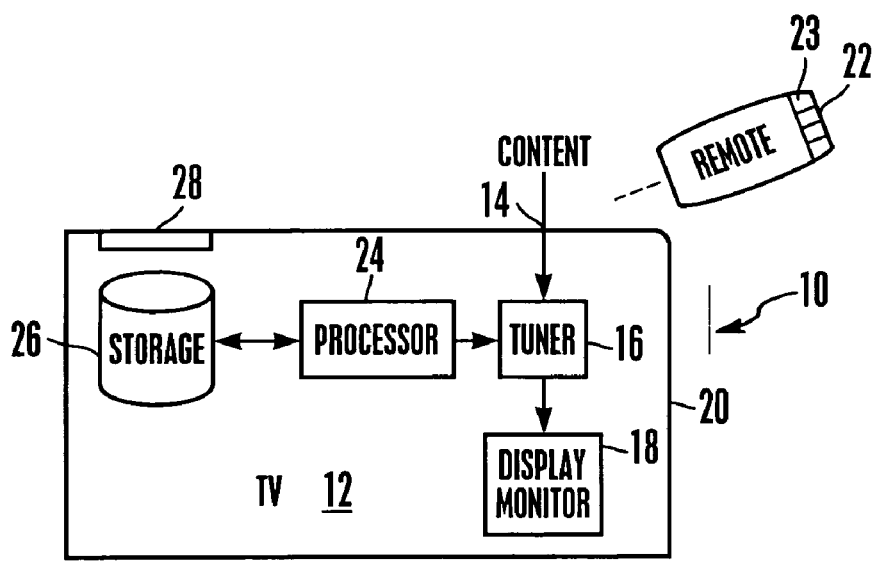
FIG. 1 is a block diagram of a first embodiment of the system of the present invention, showing the microprocessor in the TV.

Referring initially to FIG. 1, a system is shown, generally designated 10. As shown, the system 10 includes a TV 12 that conventionally receives televised analog and/or digital content at a content receiver 14 (e.g., an antenna, satellite dish, set-top box, etc.), with a channel being selectable by means of a conventional tuner 16 for display of the content on a monitor 18.

While the embodiment of FIG. 1 shows a TV 12 with a single housing that includes a microprocessor and database, it is to be understood that the term "television" and "television system" encompasses any apparatus that has a television tuner and the below-described capability in a single housing or in separate housings that cooperate together. For instance, the term "TV" encompasses the television system shown in FIG. 1, as well as a conventional television in combination with a set-top box that functions in accordance with the present invention. In the latter example, the set-top box might include, e.g., the microprocessor discussed below.

In the preferred non-limiting embodiment shown, the TV 12 includes a housing 20 that holds the conventional television tuner 16 which receives the TV signals. One or more viewer input devices, such as but not limited to a wireless TV remote control device 22, can be used in accordance with principles discussed further below. The remote control device can have a numeric keypad 23.

A microprocessor 24 communicates with the TV circuitry for executing various user interface (U/I) logic in accordance with the disclosure below. As intimated above, the microprocessor 24 can be located in the housing 20 or it can be disposed elsewhere, such as in a set-top box, remote control device, or other component. In any case, the microprocessor 24 executes the logic set forth herein. The microprocessor 24 can also access a data storage 26 contained in computer memory, or on a hard disk drive, optical drive, solid state storage, tape drive, removable flash memory such as a Sony Memory Stick® that can be removably engaged with a receptacle 28 in the TV, or any other suitable data storage medium and potentially accessible to a network such as the Internet.

It is to be understood that the flow charts and/or other logic herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessor as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 2:
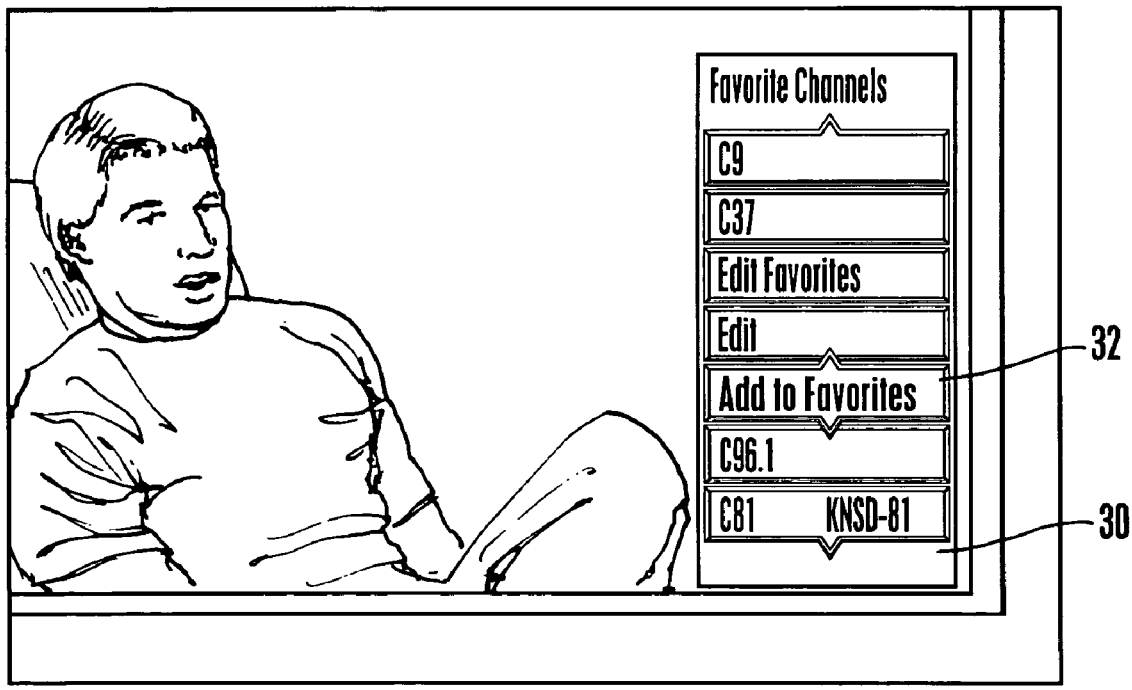
FIG. 2 is a screen shot of a display presented on the monitor, showing a favorite channels menu with an edit favorites button.

FIG. 2 shows that a favorite channels menu 30 can include an add to favorites button 32. The favorite channels menu 30 displays a list of channels that a user has designated as being "favorite" channels, and may be invoked while viewing a channel directly using, e.g., the remote control device 22 to cause the menu 30 to appear on screen, without accessing the regular user interface. Thus, the favorite channels menu 30 is a main menu.

When a channel not on the list is tuned to and the user invokes the favorite channels menu 30, the add to favorites button 32 is highlighted, and if the user selects the button 32, the tuned-to channel is added to the list. On the other hand, if the current channel is already in the list, the channel number on the list will be automatically highlighted so the user doesn't accidentally add the channel to the list twice.

In this way, unlike prior TV favorite channels lists, a user can add channels to his favorites list without navigating to a favorites menu in another user interface through four layers of menus.

FIG. 3 shows another GUI display that includes a channel list 34 listing both analog and digital channels. As recognized herein, for some channels, alternate audio and/or video may be available, e.g., a program might have audio in Spanish and in English. As further recognized herein, prior to the present invention the existence of alternate audio/video was not indicated on the channel list, requiring a user to navigate out of the channel list to a program option menu and then select from the alternate choices.

In FIG. 3, however, as shown, when a user navigates through the present channel list 34, if a channel over which the cursor is positioned has alternate audio or video, an "alternate" second layer menu 36 automatically appears to the right of the channel as shown (in the case shown, an "alternate audio" menu), and an options menu 38 listing available source options appears to the right of the alternate menu 36. A user can then choose to display content from the alternate streams of audio or video by selecting the appropriate button on the options menu 38 using, e.g., the remote control device 22. In FIG. 3, only alternate audio is available for the highlighted channel (digital channel 35.1), so no alternate digital menu is presented.

When more than one video stream option is available, a first or main stream may be selected by the processor 24 as default, with remaining streams numbered sequentially as "Alternate 1/2/3" etc. If a stream other than the default stream is selected by the user, content from the selected video stream can be valid (i.e., is displayed) until the next tuning or input change, at which time the processor 24 automatically returns to the default stream (i.e., automatically resumes displaying content from the default stream).

If the selected video stream is stopped (e.g. by a commercial), the processor 24 can return to the default (lowest) stream to cause the TV to display content therefrom, assuming the selected stream had not been the default stream. When the selected video stream returns (e.g. program returns), the processor can switch back to displaying the selected stream. If the user changed the video stream during the stoppage, the selected stream can be removed and the alternate video status updated on the menus 36, 38 to reflect the current video stream being shown, with the options menu 38 updates to show only the video streams currently available.

In the case of alternate audio, the default audio stream can be determined according to the language preference selected in the main TV menu. For example, if "Spanish" has been selected, the alternate audio defaults to the lowest audio stream that is in Spanish (using PSIP data). The available audio options can be listed as "Audio 1 XXX", where XXX is a placeholder for the language name. The language name may be written in full for, e.g., three languages supported by the TV (for example, "English", "Espanol" and "Francais"), while for other languages, only the language codes are shown, if available. As was the case with alternate video the selected audio stream can be valid until the next tuning or input change, at which time the selection returns to the default stream. If the selected audio stream is stopped (e.g. by a commercial), the processor 24 returns to the default (lowest) stream, and when the selected audio stream returns (e.g. program returns), the processor 24 switches back to the selected stream. If the user changed the audio stream during the stoppage, the selected stream can be removed and the alternate audio status updated to reflect the current audio stream, and the option menu 38 updated to show only the audio streams currently available.

FIG. 3 shows other inventive features as well, and specifically a program banner 40 which, when displayed with the channel list 34 as dictated by the user, establishes a program guide. In this way, the program banner and program guide are integrated.

With more specificity, the integrated program guide and banner 40 shown in FIG. 3 can, in one implementation, merge the analog extended data services (XDS) information provided by broadcasters with selected data from the digital program and system information protocol (PSIP) data (also from the broadcaster) to provide the user with valuable program information. Accordingly, program information at the top of the banner 40 uses PSIP and XDS data to display, for the channel currently tuned to, a program title area 42, which may be one line of text, setting forth the name of the currently tuned to program. When no program title is available, a message to that effect may be displayed.

Also, the banner 40 can have a program information area 44 which can be, e.g., two lines of text and which displays information pertaining to the program that is tuned to. When no program information is available, an appropriate message to that effect may be displayed. Further, a time remaining area 46 can display the time remaining in the program, and program rating information area 48 can display the V-Chip rating of the program. Moreover, a stream information area 50 can display the program's stream resolution (480i, 480p, 720p, 1080i, etc.), format (16:9 aspect ratio or 4:3 aspect ratio), and closed captioning information if any (by means of displaying the closed captioning icon). If the channel is an analog channel then resolution and format can be displayed as "NTSC", for National Television Systems Committee.

Additionally, the banner 40 can include a channel number display area 52 and a channel call sign display area 54, which respectively display the channel number and station call sign (from, e.g., PSIP data) of the tuned-to channel. The complete channel number ("C" may be used for cable, with no indicator for antenna channels) can be displayed for digital and analog channels. If a user has defined a channel label for the tuned-to channel, this label may be presented in the call sign display area 54 instead of the PSIP derived call letters. If desired, the size of the channel numbers may vary depending on the length of the channel number, i.e., a large font size can be used until the area 52 isn't large enough to display all the numbers, at which point the font size can be reduced.

If desired, if there is a delay of more than a few seconds while PSIP program information is being acquired for, e.g., a major digital channel, the program information area 44 can display "Receiving program information" (or similar message).

In any case, the channel list 34 displays information for all channels, both digital and analog. As shown in FIG. 3, the channel list 34 indicates the channel on which a cursor 56, controlled by means of the remote control device 22, has been positioned.

A program may be blocked according to the V-Chip settings within a conventional parental control menu. If the program is blocked, the following can be made to occur by the processor 24. The current rating may be displayed, and a lock icon can appear in the "details" portion of the channel banner. The program information, time/duration can be left blank, and a "Program Blocked" message displayed in the title area 42.

In some implementations the channel list 34 is a scrolling list if there are too many channels to fit within a single window. Graphic arrows may be used to indicate that the list continues. In non-limiting implementations, pressing <Up> on the remote control device 22 from the first listed channel can take the user to the last channel in the list 40, and the cursor does not move to the bottom position in the list 40. Pressing <Down> from the last channel can take the user to the first channel in the channel list, but the cursor does not move to the top position in the list 40. The transition from the first to last channel is thus seamless. The channels displayed need not reset to represent the beginning or end of the channel list. In other words, the cursor 56 can remain at the top or bottom of the list.

Additionally, if desired "Speed Surf" can be invoked when the <Up/Down> button on the remote control device 22 is held down continuously (longer than a predetermined time prior). When this occurs, the next channel is tuned to and then the cursor 56 moves quickly up or down the channel list 40. Furthermore, "Super Speed Surf" can be invoked when the cursor is held <Up> or <Down> for an exceptionally prolonged period, e.g., five seconds, after which the channels on the list 40 can be incremented in groups of channels as they scroll instead of incrementing every channel.

If desired, when new information about the currently highlighted major digital channel is acquired, the processor 24 can tune to that channel. Pressing <Select> may have no effect if information for the highlighted channel has not yet been acquired, but if information has been acquired, <Select> tunes the channel and turns off the Guide. In the particular non-limiting embodiment shown in FIG. 3, pressing <Left> on the remote control device 22 can have no effect, whereas pressing <Right> while on a major digital channel can move the cursor 56 to the second layer menu 36.

If a channel is hidden by the user in accordance with channel show/hide principles known in the art or as set forth further below, the hidden channel can be immediately removed from the channel list 40. The cursor 56 will then highlight the next channel in the list and the processor 24 will tune to the highlighted channel.

FIGS. 4-6 show a show/hide menu 60 of the present GUI that can be invoked using the remote control device 22. Unlike current show/hide GUIs, the show/hide menu 60 integrates both analog and digital channels into a single show/hide menu. By establishing the show/hide status of a channel, a user determines whether the processor 24 will display the channel on the channel list 40 and whether, regardless of whether a channel list is displayed, the channel will be skipped over (if hidden) when the user uses the remote control device to surf TV channels or tuned to (if shown). A hidden channel can be tuned to be directly inputting its channel number.

As shown, the show/hide menu 60 lists all available channels along with their status (shown or hidden), and when the GUI cursor 62 is placed over an analog channel (FIG. 4), the status of the channel can be changed if desired by toggling the status. The same is true when the cursor 62 is positioned over a major digital channel (FIG. 5), at which point the processor 24 displays a sub-menu of any minor channels that might be associated with the major channel so that the cursor 62 can be moved over a minor channel (FIG. 6) to change its status independently of that of its major channel.

In non-limiting implementations, the following rules may be used.

1. The show/hide list begins with the current channel.
2. If a channel is directly turned to using the numeric keypad 23 of the remote control device 22 or using the Channel up/down buttons, the menu 60 is updated to begin with the directly accessed channel.
3. If a channel is tuned via a <Jump> command the menu is updated to begin with the accessed channel.
4. If <TV/Video> is pressed on the remote control device 22 the input changes and the menu 60 redisplays with the cursor 62 on the channel icon.
5. If the <Twin> feature is activated, the menu 60 redisplays with the cursor on the channel icon.
6. The status indicated on the menu 60 for a channel is the current condition of the channel.
7. When the cursor 62 highlights the Show/Hide columns, the processor 24 causes the TV system 10 to tune to the channel accessed with the cursor 62.
8. The cursor 62 "wraps around" all channels in the menu 60.
9. The arrows 64 (FIG. 4) above and below the menu 60 are displayed when all of the available channels cannot be displayed at the same time.
10. The major channel setting is a global control for its minor channels, i.e., setting a major channel to "Hidden" will change the settings of all associated minor channels to Hidden, and setting a major channel to "Shown" will change the settings of all associated minor channels to Shown. Minor channel status can be set independently of the major channel, and if all of the minor channels of a particular major channel are set to Hidden (or Shown), the associated major channel is likewise automatically set to Hidden (or Shown). If new channels are made available, their default setting is shown.

While the particular NAVIGATION AIDS FOR TELEVISION USER INTERFACE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A TV system, comprising:
    at least one TV tuner receiving TV content;
    at least one TV monitor for displaying the TV content; and
    at least one processor communicating with the tuner and monitor, the processor causing a graphical user interface (GUI) to be displayed on the monitor, the GUI including at least one channel list merging analog channel information with digital channel information to render a list of analog and digital channels such that at least one digital channel appears on the list between two analog channels, a program banner being presented on the display with the channel list, the banner including a program information area indicating a resolution and/or an aspect ratio of a stream indicated by the banner.

2. The system of claim 1, wherein the analog information is extended data services (XDS) information provided by broadcasters and the digital information is digital program and system information protocol (PSIP) data from broadcasters.

3. The system of claim 1, wherein the channel list displayed along with the program banner establishes a program guide.

4. The system of claim 3, wherein the program banner includes a program title area, a program information area, and a time remaining area.

5. The system of claim 4, wherein the banner further includes a program rating information area.

6. The system of claim 5, wherein the banner further includes a channel number display area and a channel call sign display area.

7. The system of claim 3, wherein the banner can be displayed apart from the channel list.

8. The system of claim 1, wherein the processor causes a cursor to scroll through the channel list as a user pushes up and down buttons on a remote control device, and increases the speed to a faster speed if a user holds down an arrow on a remote control device for at least as long as a predetermined time period.

9. A TV system, comprising:
    at least one TV tuner receiving TV content;
    at least one TV display for displaying the TV content; and
    at least one processor communicating with the tuner and display, the processor causing a show/hide menu to be displayed on the display, the processor establishing that:
    a show/hide channel list of the menu begins with a channel currently tuned to;
    if a first channel is directly tuned to using a keypad of a remote control or using channel up/down keys, the menu is updated to begin with the first channel and simultaneously displayed; and
    if a second channel is tuned via a <Jump> command the menu is updated to begin with the second channel.

10. The system of claim 9, wherein
    if a <TV/Video> key is pressed on the remote control the menu redisplays with a cursor on a channel icon.

* * * * *